United States Patent [19]

Waters et al.

[11] Patent Number: 5,832,069
[45] Date of Patent: Nov. 3, 1998

[54] OBJECT ORIENTED SYSTEM FOR MODELING TELECOMMUNICATIONS CIRCUITS TO ESTIMATE THE ACCESS COST FOR LEASING SELECTED CIRCUITS

[75] Inventors: David Brock Waters, Shawnee; Keenan Wayne Hammond, Overland Park, both of Kans.; Chun Choon Lam, Kansas City, Mo.; Jennifer Jo Lingenfelter, Overland Park, Kans.; Terry Lee Revell, Stilwell, Kans.; Henry Hobart Slack, III, Overland Park, Kans.

[73] Assignee: Sprint Communications Co L.P., Kansas City, Mo.

[21] Appl. No.: 455,050

[22] Filed: Nov. 17, 1995

[51] Int. Cl.⁶ .................................................. H04M 15/00
[52] U.S. Cl. ........................... 379/115; 379/119; 379/207; 370/238
[58] Field of Search ..................................... 379/111, 112, 379/114, 115, 119, 121, 207, 229, 221; 370/54, 94.1, 238, 241, 250, 357, 359; 395/200.15

[56] References Cited

U.S. PATENT DOCUMENTS

| | | | |
|---|---|---|---|
| 5,163,042 | 11/1992 | Ochiai | 379/112 |
| 5,481,601 | 1/1996 | Nazif et al. | 379/127 |
| 5,481,604 | 1/1996 | Minot | 379/115 |
| 5,491,694 | 2/1996 | Oliver et al. | 370/95.1 |
| 5,521,910 | 5/1996 | Matthews | 370/54 |

*Primary Examiner*—Paul Loomis
*Attorney, Agent, or Firm*—Harley R. Ball

[57] ABSTRACT

An object oriented system models a selected telecommunications circuit to estimate the access cost for leasing the selected circuit. A database contains circuit data relating to a plurality of telecommunications circuits included the selected circuit. The object oriented system includes a unit cost model driver object and a domain object residing on a personal computer. The domain object comprises a plurality of telecommunications objects adapted to model telecommunications circuits in accordance with a preselected cost structure based on a plurality of access cost parameters. The driver object retrieves the circuit data for the selected circuit from the database and distributes the circuit data to the telecommunications objects. The telecommunications objects, which are adapted to communicate with one another upon receiving circuit data, collectively produce an output signal to the driver object representing the access cost for the selected circuit. The driver object, which preferably operates in a batch mode, may forward the access cost for the selected circuit to the database.

38 Claims, 7 Drawing Sheets

Microfiche Appendix Included
(2 Microfiche, 190 Pages)

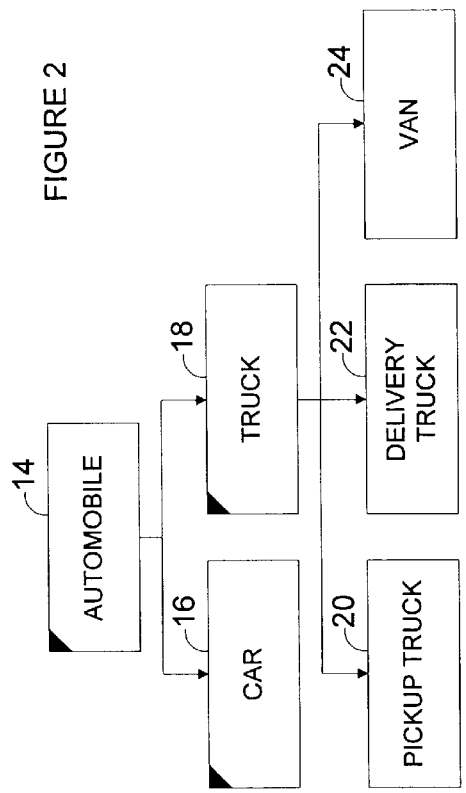
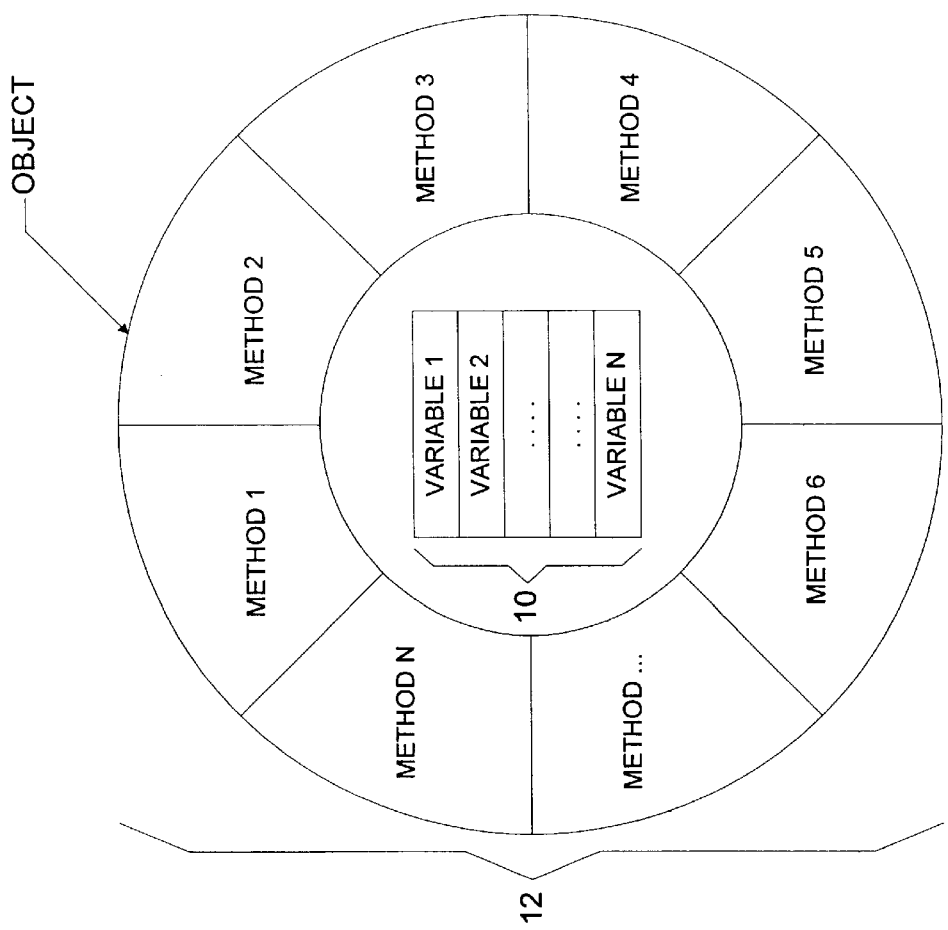

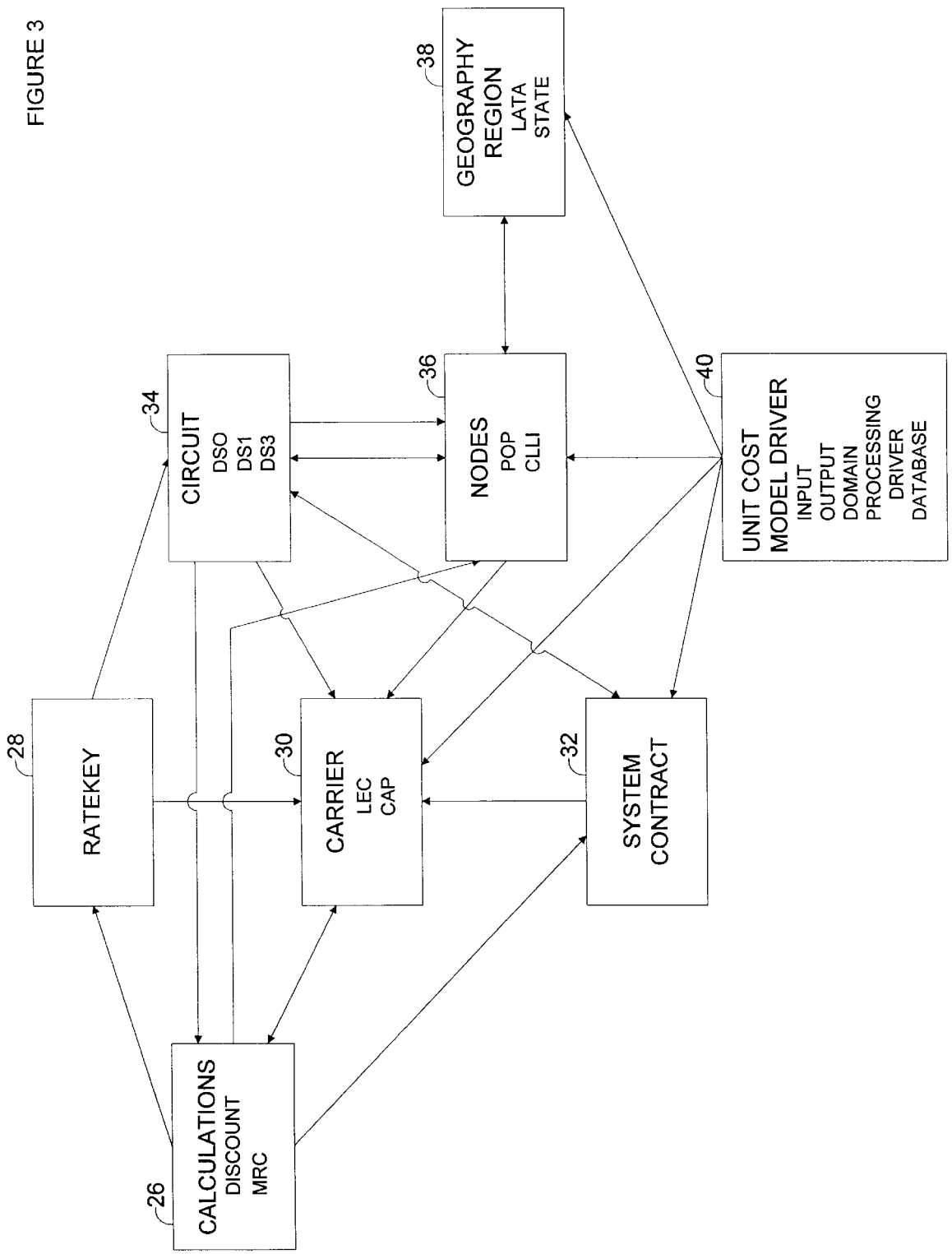

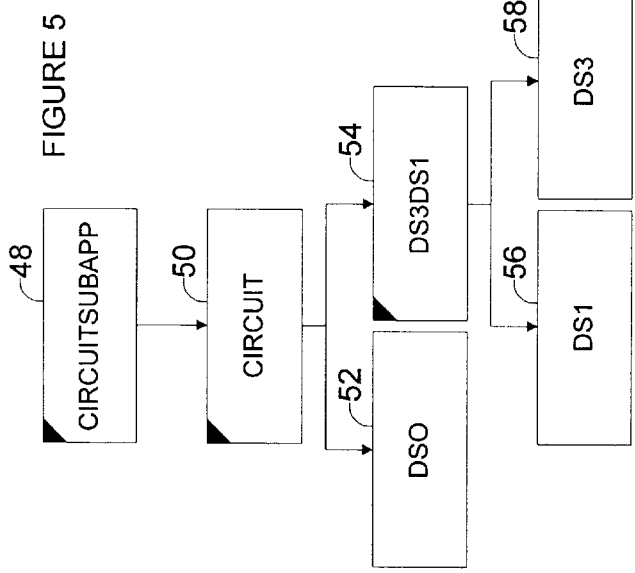
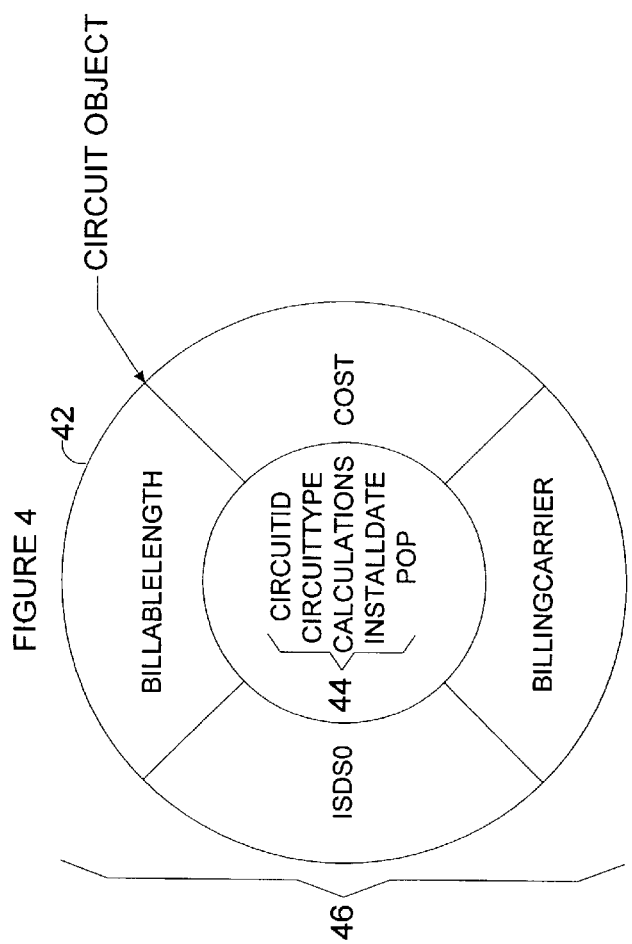
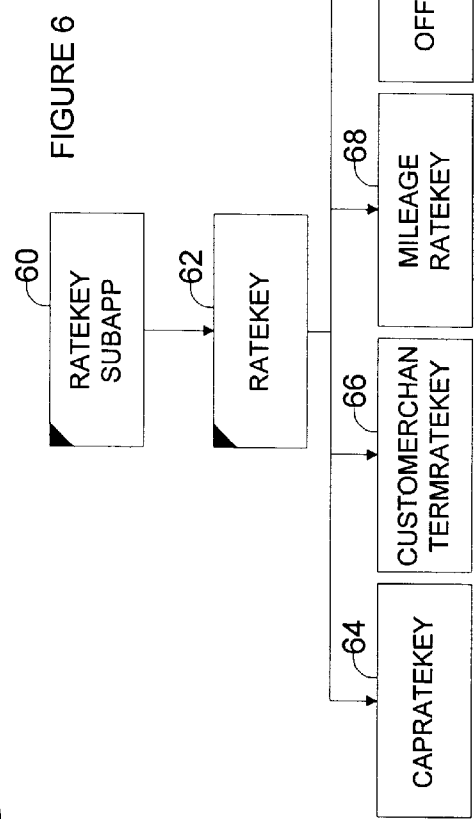

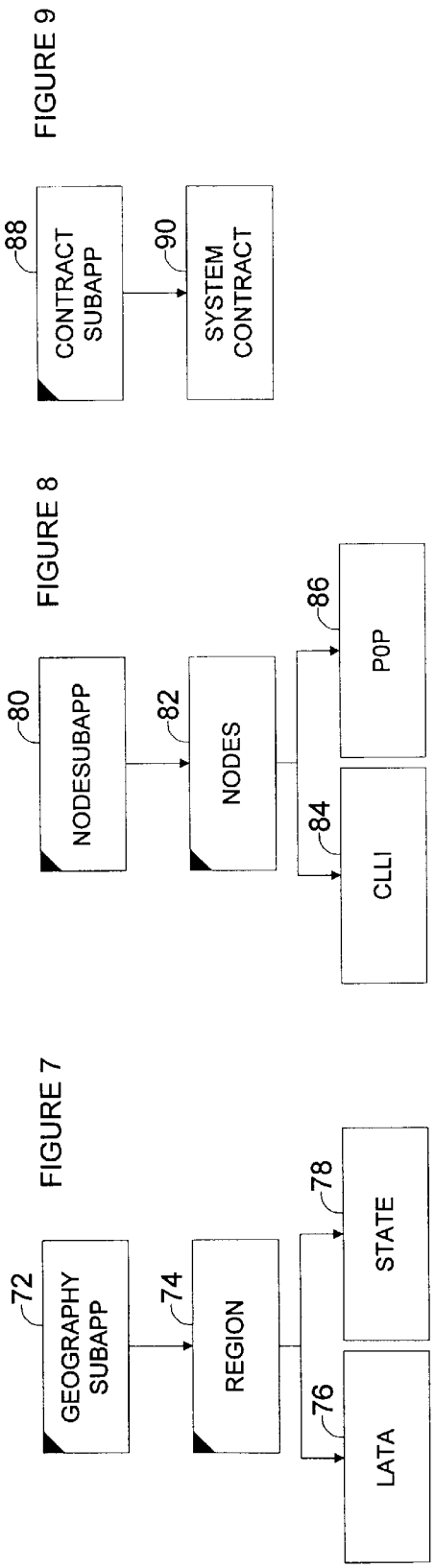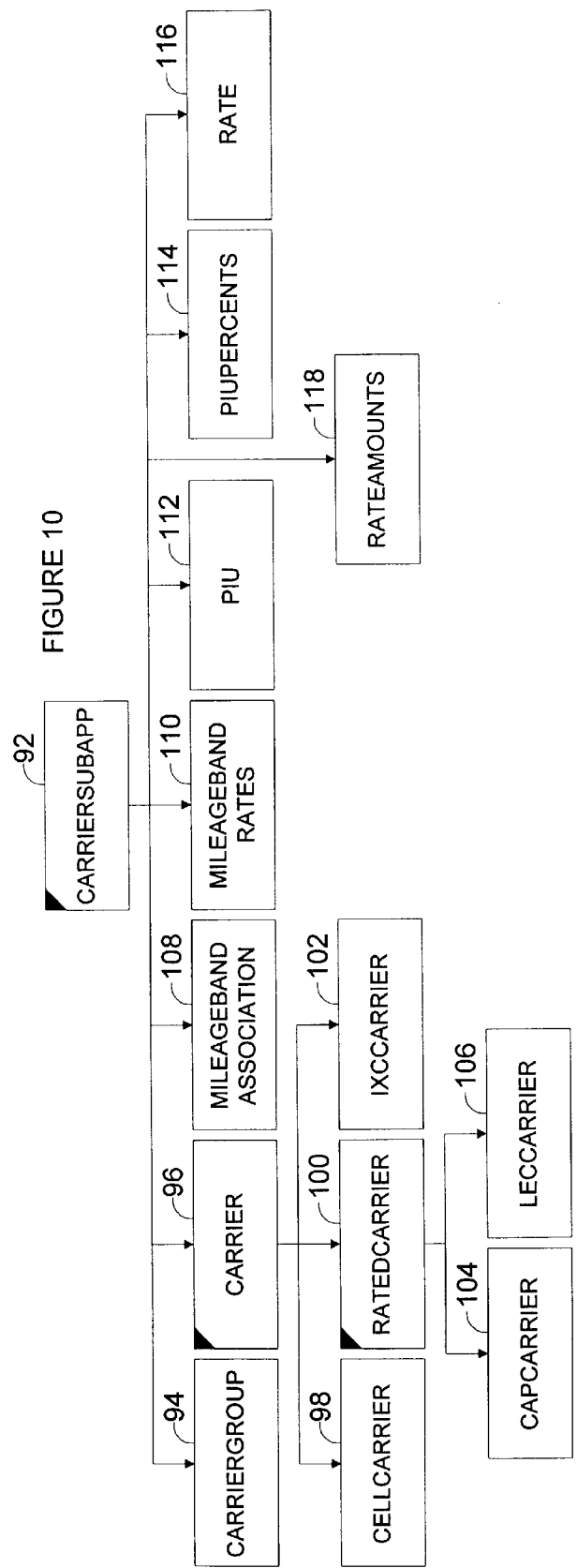

OBJECT ORIENTED SYSTEM FOR MODELING TELECOMMUNICATIONS CIRCUITS TO ESTIMATE THE ACCESS COST FOR LEASING SELECTED CIRCUITS

REFERENCE TO MICROFICHE APPENDIX

A Microfiche Appendix to this patent application, comprising 2 sheets of microfiche, contains 108 frames of computer program listings in accordance with a preferred embodiment of the present invention.

BACKGROUND OF THE INVENTION

This invention relates generally to the field of computer systems and object oriented (OO) modeling. More particularly, the invention concerns a system and process for modeling telecommunications objects for use in cost estimation and optimization of bandwidth access.

Long distance telephone companies (Interexchange Carriers or IXCs) lease telecommunications circuits from local telephone companies (Local Exchange Carriers or LECs) so that they may reach long distance customers at an End Office (EO) site or other local termination point. An originating end user connects directly to a LEC end office. This connection is routed to a Point of Presence (POP), the location where the LEC passes the call to the IXC. After travelling through the IXC circuits, the call is routed through a second POP, where the call is passed to a second LEC and eventually to the destination user. Thus, by using a LEC's services, an IXC is able to originate and terminate its customer's calls.

This service is generally termed "access." The term also describes the physical bandwidth (e.g., a DS0 circuit) required to complete a customer call from a POP to an end user. Because POPs for a particular LEC/IXC combination are contained within a Local Access Transport Area (LATA), access is generally determined for a particular LATA by an individual LEC.

Associated with this bandwidth is the cost to the IXC. The customer is typically not charged directly by the LEC. Instead, the LEC receives a fee from the IXC for providing the IXC access to the user through the LEC's circuits. This fee may be a flat charge per month, or it may be a percentage of the traffic. Therefore, access may also denote, as the term is used in the art, the cost to an IXC associated with the connection from a POP to an end user through a LEC's circuits. The physical access and its associated charge is often referred to as a leased line.

Many factors go into calculating these access charges. The calculation is broken down into two general categories, usage based and facility based, which incorporate both switched and special access. As known by those skilled in the art, switched access is a two-point transmission path provided between an end user and an IXC within the same LATA. The circuit is not dedicated for one specific path, but can be shared for usage by different customers for different times. Special access, in contrast, is a dedicated transmission path between one customer-designated premise (CDP) and another.

As known by those skilled in the art, switched access may include costs for Feature Group A (line-side service) and Feature Groups B, C, and D (trunk-side service). Rates for switched access are both usage-sensitive and mileage-sensitive. Usage-sensitive rates are based on the minutes of use (MOU) that an IXC is connected to a LEC network. The charge starts accruing when the connection is made between an IXC and a LEC, regardless of whether or not a connection to a second end user is actually completed.

These usage-sensitive rates apply only when a specific rate element is used. The total usage charge is the result of multiplying the rate elements by the MOUs, and they accumulate monthly. One such element is the Carrier Common Line (CCL), which applies to calls entering or leaving a LATA using switched access. Another element, an EO charge, applies to the end office switching and end user termination functions needed to complete the transmission of switched access to and from an end user's serving end office.

Mileage sensitive rates are based on distance. For example, a Local Transport charge recovers the LEC's costs associated with facilities between the IXC's POP and the customer end office. The greater the distance between the POP and the customer, the greater the access charge. Surcharge rates apply if the actual Local Transport charge is lower than a Minimum Monthly Usage Charge (MMUC). Also, nonrecurring one-time only charges may apply for specific work activity such as installation of service, service rearrangement, 800 line access, 900 line access, or other common switching chargeable optional features.

Special access service uses facilities and equipment dedicated solely to that service. These are not shared by or used as a part of any other customer's service. It is concerned most often with combinations of CDPs where there is a connection from an end user to end user, end user to IXC, or IXC to LEC EO. Both premises must be within the same LATA, but they may be in different exchanges served by different LECs. The premises can be connected directly or through the bridging or multiplexing functions at the LEC's hub, a LEC designated serving EO where bridging or multiplexing functions are performed.

Special access services are categorized by the type of transmission channel used. The available channel characteristics provide multiple applications per type. Channel types include metallic, telegraph, voice grade, program audio, video, digital data, wideband, and high capacity, and they provide applications from asynchronous data to large volume voice and data transfer in digital form.

Special access also is categorized by service. Dedicated access service allows connection of an end user to an end office equipped to provide Wide Area Telecommunications Service (WATS). Available service configurations include two-point service, connecting two CDPs or a CDP and an end office, or multipoint service, connecting three or more CDPs through a central hub.

Monthly, daily, and nonrecurring rates complete the elements included in special access costing. All special access circuits are charged for at least two monthly rate elements: Channel Termination (CT) and Channel Mileage (CM). Channel Termination is associated with the transmission path between a CDP and serving EO. One channel termination applies for each CDP where a termination occurs. Channel Mileage is related to the transmission facilities between serving EOs associated with two CDPs, a serving EO associated with a CDP and a LEC hub, a serving EO associated with a CDP and an international boundary point, a serving EO associated with a CDP and a WATS serving office, and two LEC hubs. Channel Mileage is rated in terms of Mileage Bands, and two rates apply for each band: a flat rate per band and a flat rate per mile. Finally, some special access circuits are charged monthly rates for optional features and functions (OFF), bridging, message station equipment recovery charges (MSERC), surcharges, and the optional payment plan for high-capacity services.

OFF includes services to improve quality or satisfy a special communication requirement such as signaling capability, hubbing functions, conditioning, and transfer arrangements. Bridging charges apply when bridging connects three or more CDPs on a multipoint service arrangement. Bridging allows intercommunication between locations, and the charge is applied per bridging termination point. Surcharges accrue when special access is connected to a PBX or equivalent device capable of interconnecting the special access service with local exchange service. MSERC is assessed to customers having a surcharge and recovers the portion of the expenses assigned to special access.

Daily rates are flat, recurring rates that apply to program or video service. They apply to each twenty-four hour period to which a service is provided, either for full or part-time use. However, these will not exceed monthly rates. Finally, nonrecurring rates include installation of service and service rearrangement.

Each of these rates is listed in a tariff schedule that a LEC follows and which has been approved by state and federal regulatory agencies. Access tariffs specify the types of access services a LEC will offer, the types of IXCs that can use the services, and the rates for each service. LECs operate under tariffs governing access services, local services, interLATA Message Telecommunication Services (MTS), intraLATA WATS, and intraLATA private circuits.

Access services provided by LECs are categorized either as interstate or intrastate. A LEC must file tariffs for each jurisdiction to support the application, their services, charges, and terms. This jurisdiction is determined as a function of the origination and termination of the users. Therefore intrastate and interstate charges govern the application of charges and terms for those services used to originate and terminate calls in the same or different states, respectively.

When one or more LECs are involved in providing service to an IXC for a particular circuit, line, or trunk, the process of billing an access service is referred to as Meet Point Billing (MPB). A "meet point" is a boundary designated by two LECs at which one LEC's responsibility for access service ends and the other LEC's responsibility begins. One or more meet points may exist on a given service. MPB is applicable to both switched access and special access. MPB encompasses all facets of access including installation, service, rating, and billing. Each LEC shares charges in proportion to the amount of service that passes through each LEC's circuits.

The above listed charges as well as a variety of other charges are factored into the per unit cost of access to IXC circuits. (One skilled in the art may determine, generally, other required charge variables by referring to the Microfiche Appendix. Charge elements associated with access variable elements are described by the classes, objects, methods, etc. in the Microfiche Appendix.) Unfortunately, no fast, accurate, or reliable way currently exists for incorporating the variables associated with access cost and determining the cost to long distance companies of gaining this access.

Prior to the current invention, systems for determining access cost generally occurred on a limited program module such as a COBOL module or associated program located on a mainframe. However, the module did not allow a user to change elements at instantaneous, discrete intervals. It incorporated only a limited number of rate elements, so that any attempted determination of access was not accurate. Moreover, maintainability was inefficient and growth was limited. Current technology in Information Systems required the ability to offload information from mainframe systems onto personal computers (PCs), to provide for decentralized control from the mainframe and to allow for more responsibility and distributive processing at the personal/PC level. This was a function not available to the COBOL module.

Prior to such modules, no expansive system was used. Standard modeling did not really exist. Instead, individual groups had separate, discrete methods of making manual calculations.

SUMMARY OF THE INVENTION

It is therefore a desirable feature of the present invention to provide a system that will accurately calculate the cost of the access provided by a local exchange carrier to an interexchange carrier and which calculation will incorporate necessary elements of the rate costing.

It is a further desire that the system be easily maintainable, being easily expanded, reused, or otherwise modified.

It is also desirable that the elements of the system are capable of being changed at instantaneous, discrete intervals.

It is another desire that the system have the capability to be offloaded onto a personal computer to allow for distributive processing at the personal computer level.

It is a further desire that object oriented approach be used to create the system, allowing the system to be easily maintainable and reusable, and that the system be composed of objects modeling telecommunications objects for cost estimation purposes.

Additional aspects or other features of the invention are set forth in the description which follows and will be apparent from the description or from the practice of the invention.

This invention provides a system that calculates the POP to premise end to end unit fixed facility access cost of circuits that are to be leased from a LEC by an IXC.

Preferably, the system is designed using an OO approach which may reside on PCs. As all processing and utilization of the OO system can occur on the PC, the system thereby provides the requisite decentralization from the mainframe. The modular nature of OO allows it to be easily reused and modified. A change in one object will not require a parallel change in all objects since the objects are relatively self contained.

More particularly, the system is an OO application comprised of objects which model telecommunications objects for access management and cost estimation and optimization purposes. Preferably, each object contains unique classes, and further, methods and instance variables. The objects are comprised of a Circuit, a Carrier, a Geography comprising a LATA and a State, a Node comprising a POP and a CLLI (Common Language Location Indicator), a SystemContract, a RateKey, and a Calculations object. Combined, these objects generally form a domain.

The domain is an access costing environment which allows modeling of the telecommunications system where unique objects have responsibilities. Importantly, the Calculations object, for example, is treated as a valid object with responsibilities, whereas most object oriented techniques treat objects as processes with associated data. The object is portable, in that it can be logically picked up and moved.

Another aspect of an embodiment of the present invention is that the Carrier, for example, incorporates the applied costs of access, including special versus switched access and intrastate verses interstate access. The object incorporates all elements in one return.

In general, the objects in the preferred embodiment of the present invention are used in a batch processing mode, whereas other objects are generally processed in a GUI (Graphical User Interface) mode. Such batch processing (or background processing) provides for added processing efficiency. In OO terminology, the objects "know" and are "aware" of the data they contain and can transfer that data to another object upon request.

Working in conjunction with the domain objects is the Unit Cost Model Driver object. The Unit Cost Model Driver controls the initialization of the objects and the population and extraction of the data values. After the domain objects are populated with data, the domain objects transfer information about the objects they are modeling. For example, a circuit object is able to transfer data telling a carrier that it is a DS0 or DS3 circuit. This information will then be used to determine rate elements for the cost calculation. After the cost calculation is complete, the processing driver object may extract values to a database to be used for further estimation and optimization of costs.

BRIEF DESCRIPTION OF THE DRAWINGS

The accompanying drawings, which are incorporated in and constitute part of the specification, illustrate presently preferred implementations of this invention and, together with the general description given above, the detailed description of the preferred embodiment, and the Microfiche Appendix containing the encyclopedia of classes of the preferred embodiment, explain the principles of the present invention.

In the drawings:

FIG. 1 is a representation of the structure of an object;

FIG. 2 illustrates the inheritance and abstract properties of object classes;

FIG. 3 illustrates an overview of and the collaboration between the objects of the system;

FIG. 4 is a representation of the structure of a Circuit object class;

FIG. 5 illustrates a hierarchy class structure of a Circuit object class;

FIG. 6 illustrates a hierarchy class structure of a RateKey object class;

FIG. 7 illustrates a hierarchy class structure of a Geography object class;

FIG. 8 illustrates a hierarchy class structure of a Node object class;

FIG. 9 illustrates a hierarchy class structure of a System-Contract object class;

FIG. 10 illustrates a hierarchy class structure of a Carrier object class;

DETAILED DESCRIPTION OF THE PREFERRED EMBODIMENT

Figure 11:
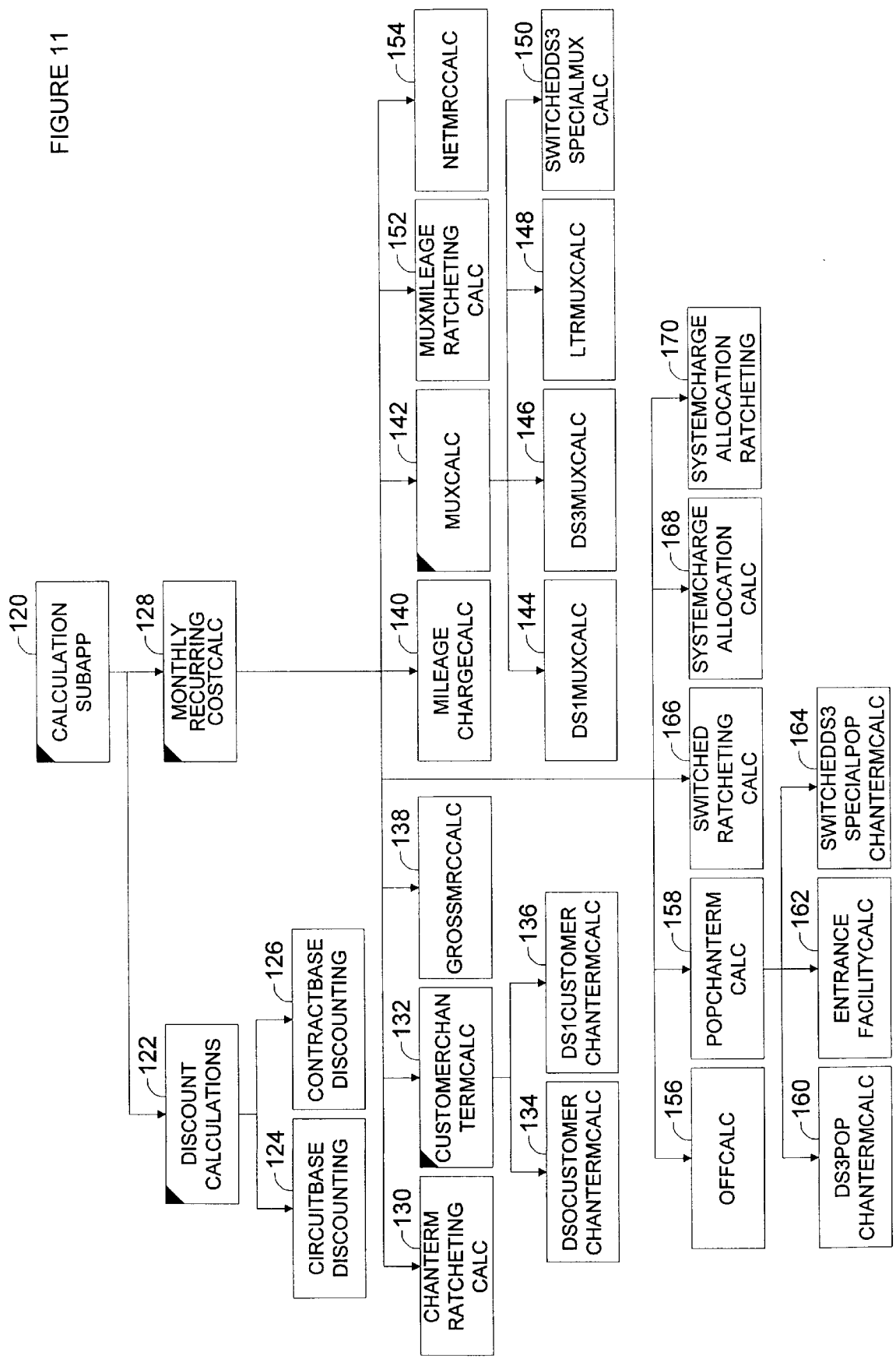
FIG. 11 illustrates a hierarchy class structure of a Calculation object class.

The preferred embodiment of the present invention is hereinafter described more completely with reference to the drawings and the Microfiche Appendix. This invention may be implemented in many forms and should not be construed as limited to the implementations as set forth herein. This embodiment is provided so that the disclosure is complete and will fully convey the scope of the invention to those skilled in the art.

The preferred embodiment is constructed using an OO programming language such as Smalltalk by Digitalk. The code would reside on a computer having a processor and running an operating system. The preferred system resides on a personal computer (PC) using the OS/2 operating system. A database would be accessible to the processor so that the OO system could populate objects and generally transfer data. Therefore, it could reside on the PC in a non-volatile memory location or in another convenient location such as a mainframe or mini-computer. The system would contain volatile memory for short-term, quick access of data.

In the preferred embodiment, the database resides on an IBM mainframe. The mainframe and PC are connected in a client-server architecture where the mainframe is the server and the PC is the client. The mainframe would allow for greater storage capacity and access in a system such as this which may contain over one-half of a million data circuits for thousands of carriers. The database is a relational database which is statically bound to a "C" language Dynamic Link Library (C DLL). In such a database, the Structured Query Language (SQL) that interacts with the database is embedded in the C program. The OO system is linked to the host database via a C Program DLL.

In the preferred embodiment, a number of OO objects model telecommunications objects. The collective system is unique in that it allows the estimation of the unit cost for access to telecommunications circuits by combining the behaviors of the separate objects, where the objects model the behavior of telecommunications objects for access management cost estimation purposes.

The present invention may be used as a tool to provide decision support. This system would allow calculation of the most efficient use of circuits in a LATA and the associated configuration of those circuits. For instance, after calculating the cost of the circuits, one could compare the efficiency of one POP to that of another. Such a comparison may suggest reconfiguration or modeling of a POP. An examination of the calculated cost data per circuit may suggest relocation of a POP to lower access costs. Further, the cost data may be used to negotiate with different carriers, where demonstrating a lower cost given by one carrier would allow for a greater bargaining position to lower unit costs of a second carrier.

Due to the modular nature of OO, the system is efficient and easily maintainable. Objects may be modified and reused without modifying other objects. The modeling and modular nature of the objects allows the calculation of cost for over one-half of a million circuits for thousands of carriers. This leads to an accurate representation of costs for access.

OO technology has become a powerful tool for the development of computer-based systems. The specialized nature of OO provides for easy expansion and reusability of computer systems. Existing portions of a software system can be adapted for new requirements or additional needs without changing all of the computer system. If a modification of one area is needed, only that small immediate portion need be altered. With other existing programming techniques, by contrast, most or all of a system would have to be modified to expand that system.

The most basic components of OO include objects, classes, methods, instances, and messages. The focus of these structures is on responsibilities and relationships, rather than on functions and data. Combinations of components create an independent entity that may itself be modified or reused without affecting other surrounding entities that depend on it for information.

The basic building block is an abstract data type called an object. The term object is a generic description for any entity encapsulating data and processes. Thus, an object could be a class, an instance, or a variable and can contain one or more objects. An abstract class may also be described as a virtual object because there are no instances of an object per se. It provides, however, a convenient place to put all methods and variables that apply as a group to any other objects having similar characteristics and behaviors.

Objects are self describing data structures whose main function is the dynamic allocation of memory space to hold values. They combine related characteristics of data and procedure, a technique called "encapsulation." Methods are the code or procedure portion and they describe how an object responds to a message from another object. The methods describing the responses, taken as a whole, describe the object's behavior. Instances are the data portion that give methods the information with which to evaluate messages and respond. Every object is an instance of a class where the class defines the structures and behaviors of all its instances. It is a protected data structure and the data stored inside is accessible only through messages which respond to other objects. Each operation or function that can access the data structure is called a method.

The first major advantage of OO is the process of packaging related components of object data and procedure together. This information hiding or encapsulation is the characteristic which depicts the data variable being encapsulated by the methods. For example, in FIG. 1, multiple data variables 10 are encapsulated by a number of methods 12. Encapsulation prevents unauthorized messages from reaching the data. Data independence and integrity are thereby provided because an object's data structure is accessed only by its methods.

This hiding protects an object's variables from being corrupted by other objects. If other objects had direct access to an object's variables, eventually, one of them would incorrectly handle a variable and damage the object. In addition, by hiding its variables, an object protects other objects from the complications of depending on its internal structure. One object need only request information from another. As a result of these concerns, only the associated methods of an object know the internal data structure of that object.

Methods are similar to function definitions in other software programming languages. They are a type of code, algorithms that determine an object's behavior and performance in response to receiving a message. Methods are evaluated by an object and an object is returned as the result of a method.

A routine may request an object to perform one of its methods by sending the object a message. Messages are the language of interaction which is used to express computing requirements to objects. A message is the equivalent of an operation or function call. Messages are sent to objects to generate action or request services from an object.

The message may be composed of three parts: the name of a receiver object, a message selector, and any arguments. These items can alternatively be expressed, respectively, as an object reference of the instance to receive the message, the method the receiver object is requested to perform, and any parameters needed by the receiving method to properly carry out its function. The third part is optional because if the method does not need any information, there are no parameters in the message. While most messages are sent to object instances, a message requesting that a new instance be created may be sent to an object class. The class will cause a new instance to be created and will return an object identifier by which that object will be known.

This interaction of objects through messages is described as "collaboration." Messages are usually two-way communications. The primary communication is a request from the sender of a message to the receiver. This involves only a one way collaboration. However, the sender may also require a response from the receiver, or the receiver may invoke a request to the original sender, involving a two-way collaboration.

In addition to methods, each defined object will generally be manifested in a number of instances, each instance containing a particular data structure for a particular example of object. Each instance can access all methods in the object and the instance may contain one or more instance variables.

Variables are containers which may hold a pointer. The object pointer in a variable changes when an assignment expression is evaluated. Because an assignment makes a copy of the pointer to an object and not a copy of the object itself, the variable may have a different object pointer at different times.

Classes are the program modules of OO and they describe the objects, methods, and messages of a system. A class defines the behavior of similar objects by specifying their components: the variables they contain and the methods available for responding to messages. Classes are objects composed of other objects, and they can provide complete capabilities to solve a particular problem.

Objects of a class having similar characteristics and common behavior are instance objects of the class. All objects which are instances of the same class are similar because they have the same structure, the same messages to which they respond, and the same available methods. An object's internal variables are called instance variables and they are themselves containers for other objects. Whereas class objects contain information about instance objects, instance objects contain system information.

The class hierarchy structure provides the second of the two primary characteristics which allow flexible and reusable programs to be developed. This is referred to as "inheritance." Classes form a hierarchy consisting of a root class and many subclasses. Each subclass inherits the functionality of all its superclasses in the hierarchy. Such functionality includes inheritance of instance variables, class variables, and methods. FIG. 2 demonstrates the concept of inheritance. The superclass Automobile 14 is the root class. The dark triangle in the upper left corner of class Automobile 14 denotes that the class is an abstract class and that it contains no instance objects. For clarity, note that an instance object is not equivalent to an instance variable. Automobile 14 has a subclass Car 16 and a subclass Truck 18, which are also abstract classes. Subclass Truck 18 has subclasses Pickup Truck 20, Delivery Truck 22, and Van 24. In this example, Car 16 and Truck 18 inherit the functionality of the superclass Automobile 14. Likewise, classes Pickup Truck 20, Delivery Truck 22, and Van 24 will contain the functionality of superclass Truck 18 and superclass Automobile 14. However, because they are sibling classes, Pickup Truck 20 will not have the functionality of specific methods added by Van 24. In addition, because Truck 18 is the parent of Van 24 and not the child class, Truck 18 will not have specific methods added by the Van 24 class.

Inheritance allows previously written programs to be broadened by creating new superclasses and subclasses of objects. Combined with the benefits of encapsulation, inheritance allows the effects of the change to be limited to a single class. New classes are described by how they differ from preexisting objects in the superclass. Therefore, new programs do not need to be written to handle new types of data and functions. Subclasses can add additional data and methods or they can override and redefine any data elements and methods that exist in the parent superclasses. For example, the overriding technique gains its name because the method in the subclass overrides the more general version in a superclass. Thus, subclasses may use identical method names as the superclass, but the functionality may be different. An override in an object is important because other objects may still call on the override object for information without themselves having to be changed.

OO may be programmed in object oriented languages such as "C++" or "Smalltalk" or variations thereof. Smalltalk is generally referred to as a pure OO programming language and requires strict adherence to the OO methodology. "C++" is an extension of the "C" language and exemplifies a hybrid approach because conventional language features coexist with OO features.

A more detailed description of the design and operation of OO programming is provided in "Designing Object-Oriented Software," by Rebecca Wirfs-Brock, et al., published by Prentice Hall, Inc., in 1990, and also in "Object-Oriented Software Engineering: A Use Case Driven Approach," by Ivar Jacobson, et al., published by ACM Press, 1992, the disclosures of which are incorporated herein by reference.

In any OO system containing objects which interact with one another, at least two developmental concepts must occur. First, a structure must be completed for the collaborations between the objects; and second, a structure must be completed for the class hierarchy. FIG. 3 illustrates the collaborations and superclass object structures of the present system. The system includes eight main objects which can be arranged into two groups, each object modeling a telecommunications object or process.

The first group consists of seven objects that are collectively called the Domain objects. The Domain is an access costing environment in which each object models a telecommunications object or associated process. The Domain objects are: the Calculations object 26, the RateKey object 28, the Carrier object 30, the SystemContract object 32, the Circuit object 34, the Nodes object 36, and the Geography object 38. The second group comprises the Unit Cost Model (UCM) Driver object 40. It functions as a batch process and populates and extracts values from the Domain objects.

Each of these objects represents a superclass structure, with some containing subclasses. Therefore they contain class methods and instance variables which, due to the inheritance property of OO systems, may be accessed by each subclass within the superclass.

The first superclass of the first group is the Circuit object. Each superclass can be described as both a self-contained object with class methods and instance variables and also as a hierarchy structure encompassing other objects. For example, FIG. 4 illustrates a sample representation of the Circuit superclass object comprised of instance variables 44 and methods 46. The methods 46 encapsulate the variables 44 in the same manner that all object methods encapsulate data variables.

FIG. 5 represents the Circuit object superclass hierarchy. Circuit 50 is a subclass of the CircuitSubApp object 48. As shown in the hierarchy drawing, the darkened corners indicate that both CircuitSubApp 48 and Circuit 50 are abstract classes. Therefore, they do not have instance objects. Circuit 50, in turn, is a superclass which has subclasses DS0 52 and DS3DS1 54. Note that DS3DS1 54 is an abstract class having subclasses DS1 56 and DS3 58.

Each superclass and subclass level may contain specific methods and instance variables. The difference between superclass methods and variables and subclass methods and variables lies with the inheritance property. Each subclass will be able to access a superclass method or instance variable. Yet, a superclass will be unable to access subclass methods and variables. Therefore, any message sent to a superclass object, for example Circuit 50, will return an answer based on the superclass variables. While messages sent to a subclass object, DS0 52 for example, will first return an answer based on the subclass variables. If the subclass does not contain the requested information, the subclass then looks to the superclass Circuit 50 for the required variables.

Each superclass object shares inheritance relationships with subclasses where the combination of the methods and instance variables define a behavior for the class. This class and its behavior can be deemed to have certain responsibilities, where a responsibility can be described as a grouping of like methods and like instance variables. The importance of the telecommunications objects revolves around this concept. The telecommunications objects have the ability to store and transfer to another object upon request that information which they have obtained about the real objects they are modeling. Although the Microfiche Appendix contains a complete listing of all relevant methods and instance variables, reference to general applicable responsibilities will demonstrate the ability of the telecommunications objects for telecommunications access estimation and optimization purposes.

I. DOMAIN

The Circuit 50 is responsible in the first instance for knowing information about itself which it can later transfer to other objects. For example, referring to FIG. 4, the instance variables 44 include data which indicates the circuit identification, describes what type of circuit it is, when it was installed, which POP is relevant, and its calculations collection. The Circuit object 50 is also responsible for getting information about itself and transferring that information. Some methods 46 demonstrating these responsibilities are exemplified in FIG. 4 and include retrieving the billing carrier for the circuit, retrieving the billable length of the circuit, returning the identification of the circuit's POP, and costing the circuit by passing the value to each entry in the calculation collection. Using, as an introduction, these specific examples of methods and variables demonstrating specific responsibilities, general responsibilities can be derived to more fully and generally describe the object.

Circuit 50 contains data relevant to calculating the cost of a circuit. This data includes those general relevant factors described above in the Background section, as well as other relevant codes specifically identifying a real circuit for which a cost would be calculated. For each piece of data associated with a circuit, Circuit 50 is responsible for knowing that data, and it is also responsible for getting the data or setting a value, if needed.

General data items for circuits include the billable length, a determination of what type of line is used, such as DS0, whether the access to that line is special or switched, and the rate elements (e.g., tariffs and discounts) for the specific circuit. Elements such as the distance from the POP to the end user, as described above in the Background section, are to be included in the rate elements. Charges also accrue if the circuit passes through a multiplexer (mux).

Circuit 50 is also required to know variable considerations. If a meet point was a factor in the rates, the calculations collection would allocate a percentage defined by the circuit for each of the multiple carriers. Rate elements also vary if a customer has a contract. Therefore, the object must answer whether or not a system contract exists for the circuit. Finally, if the customer has provided the circuit, no costs will be returned for the calculation.

Special codes give circuits an identity and are described as such in the methods. For example, the circuit would retrieve its own circuit identification, which carrier it is a part of, which LEC it is associated with, and the circuit's network channel. Such information would then be known and transferred to a requester. The Circuit 50 is responsible for adding new information to existing data, including new rate information and new calculation collections.

These general responsibilities would be applied to the Circuit 50 subclasses DS0 52 and DS3DS1 54 as well as to Circuit 50. However, the subclasses have additional responsibilities specific to the type of circuit they model. DS0 52 responsibilities revolve around methods for deriving the number of DS0s equal to DS1s, where the number of circuits is referred to as a count. DS0 52 also initializes the calculations collection for a DS0 and returns relevant counts for DS1 or DS0 and special or switched access.

DS3DS1 54, in like manner, has responsibilities specific to itself as a subclass of Circuit 50. Similar to DS0 52, DS3DS1 54 determines values for the DS0 special and switched access counts. However, DS3DS1 54 also determines if the circuit is a primary or secondary circuit. In addition, this object is responsible for answering requests for information about contract terms, if a contract exists. Thus, it is also responsible for knowing this information.

As subclasses of DS3DS1 54, DS1 56 and DS3 58 inherit all the methods and instance variables of DS3DS1 54 and Circuit 50. In addition, each has specific new or redefined (overrides) responsibilities. DS1 56 initiates responsibilities determining customer information specific to a DS1 circuit which would be used to calculate cost. Such information would include whether the circuit was customer provided, if a channel termination charge applied, and whether the circuit was a direct transport tandem circuit or direct end office trunk circuit.

DS3 58 is more complex than DS1 56, given the advanced nature and capabilities of a real DS3 circuit which the DS3 object 58 models. The object adds requirements for knowing monthly recurring cost, mileage, and count information. In addition, these values must be transferred when requested and set when required. The object must set up for DS3 and entrance facility calculations, where an entrance facility is a POP location where the IXC and LEC equipment pass traffic. Finally, it returns or retrieves variables such as ratcheting discount, mux, and count information. As used herein, "ratcheting" refers to the practice of discounting customer charges for certain telecommunications services (e.g., placing telephone calls to a specific geographic region or during a particular time of day).

RateKey, as illustrated in FIG. 6, is more compact than Circuit. The Ratekey superclass 62 is a subclass of the RateKeySubApp 60 and a superclass of CapRateKey 64, CustomerChanTermRateKey 66, MileageRateKey 68, and OFFRateKey 70. The Ratekey object is an abstract class that defines the default way to provide a key or access to a Carrier's rating structure. RateKey 62 contains data specifying the cost center, LATA, and the jurisdiction for which the elements apply. Jurisdiction would include both interstate and intrastate elements. If it does not contain the elements, it may retrieve them. Finally, it returns these elements if requested. The actual instantiation will take place at the subclass level.

The first three subclasses of RateKey 62 each contain one method. CapRateKey 64 creates the rate key for Competitive Access Providers and Alternate Access Vendors (CAP/AAV). CustomerChanTermRateKey 66 returns the rate element for a customer channel termination rate. MileageRateKey 68 returns the mileage rate element, which originates from a tariff. Finally, OFFRateKey 70 contains several methods which override the superclass RateKey 62 and create a separate rate key object in which the rate element is passed in from the receiving object and the cost center is not. OFFRateKey 70 may retrieve or set a receiver's rate element.

Region 74, illustrated in FIG. 7, determines the geographic nature of the location of the circuit whose cost will be calculated. Region 74, an abstract class, is a subclass of GeographySubApp, also an abstract class, and a superclass of Lata 76 and State 78. The general responsibility of Region 74 is to determine whether the region in question is within the United States of America. It retrieves or sets the region information.

Lata 76 is more expansive than its parent superclass. Its contained knowledge includes the carriers, CLLIs, POPs, and states within the LATA. If the information is not contained within the object, it is responsible for returning a value to the object or setting the value. It may also determine if any of those items exist in one of the LATA's collections and retrieve or add to the collection.

State 78 is less expansive than its superclass. It is generally responsible for knowing the name and state code of the state containing the circuit. It may retrieve or set the name and state code.

Nodes 82, illustrated in FIG. 8, is a subclass of NodeSubApp 80 and a superclass of Clli 84 and Pop 86. The Nodes 82 superclass has limited responsibilities. It determines if the node is international in nature and either returns or sets the LATA and state of the node. Clli 84 expands on the information contained in its superclass. Clli 84 contains an eleven byte CLLI code and the owning carrier, rating jurisdiction, and coordinates of the end office represented by the CLLI code. In addition, any of this information may be returned to the object or set by the object.

The second of the two Nodes 82 subclasses is Pop 86. Pop 86 knows the circuits located within the POP and the location of the POP site. In addition, Pop 86 may retrieve or set this data. Finally, Pop 86 may add, retrieve, or remove a circuit from the POP site.

The SystemContract object 90, shown in FIG. 9, subclass of ContractSubApp 88, is unique in that it has no subclasses. Instead, it has a large array of methods and instance variables, creating broad responsibilities. Data contained as instance variables can be categorized as system contract information, including circuit and carrier information from the contract and the billing that it leads to. The object will be able to obtain or set the data. It may retrieve or change contract information, such as add circuits to a contract's set of circuits or return system charges to contract circuits. SystemContract 90 may obtain or set count information for circuits and return the contract identification.

CarrierSubApp 92, illustrated in FIG. 10, contains several class objects, the largest being Carrier 96. Carrier is an abstract superclass having three subclasses: the abstract class RatedCarrier 100, CellCarrier 98, and IxcCarrier 102. RatedCarrier 100 in turn has subclasses CapCarrier 104 and LecCarrier 106.

Carrier 96 gains its uniqueness in the art because it incorporates awareness of applied access charges in one return. The superclass Carrier 96 contains general information to be expanded in the subclass level. These variables include carrier identification, carrier name, and the group in which the carrier is located. Method responsibilities allow acquiring and setting the information. More importantly, Carrier 96 determines if the carrier is a competitive access provider, a cellular carrier, an international carrier, a LEC, or a rated carrier.

CellCarrier 98 and IxcCarrier 102 contain limited responsibilities. Each responds whether it is a cellular carrier or interexchange carrier, respectively. The RatedCarrier object 100, on the other hand, is quite extensive.

RatedCarrier 100 is concerned with rate storage and discount charge calculation. If given a rate key, the RatedCarrier 100 can produce an applied charge for a given rate element. Because not all carriers can produce such a charge, carriers that have the capability are subclasses of RatedCarrier 100. RatedCarrier 100 contains data associated with ratcheting discounts, including channel termination charges, ratcheting code, and maximum percentage of ratcheting available for the carrier. Rate and rate amounts, including fixed and variable charges, are also contained. Methods are responsible for obtaining and setting the data. In addition, RatedCarrier 100 manipulates rates. Specifically, for both interstate and intrastate rating, it may set the rates amount for appropriate rate keys. Fixed and variable charges are calculated from the applied rate and returned as a charge to the appropriate request. Other interstate and intrastate rate elements are returned for the appropriate rate key.

CapCarrier 104 and LecCarrier 106, as subclasses of RatedCarrier 100, inherit all the methods and variables of their superclass RatedCarrier 100 and its superclass Carrier 96. CapCarrier 104 mainly accesses the rate variable for the carrier and returns the carrier's average DS1 rate. LecCarrier 106 obtains and sets the variable for Percent Interstate Usage (PIU), a variable contained in the object. In addition, the object can access entries to the LecCarrier's PIU. If some version of a state/LATA combination is not found, an empty PIU is returned.

CarrierSubApp 92 also has seven other classes. They are CarrierGroup 94, MileageBandAssociation 108, MileageBandRates 110, Piu 112, PiuPercents 114, Rate 116, and RateAmounts 118. None of the remaining classes have subclasses.

CarrierGroup 94 is responsible for parent and subsidiary carrier data. The object first determines the name of a carrier group and if the carrier has a subsidiary. It may retrieve a carrier based on a carrier identification or add or remove carriers in the group. MileageBandAssociation 108 contains information for the length, in miles, of a circuit mileage band and the associated rate amounts. The object can obtain or set the beginning and ending distance of the band or the rate amounts. MileageBandRates 110 contains the mileage band association variable. It can retrieve or set data for mileage band association collection, and it can retrieve, remove from or add to the data from the collection of mileage band associations.

Piu 112 holds LATA and state PIU data. Methods will allow it to retrieve or set PIU data. The object may add new entries for appropriate PIU dictionaries, where the PIU can be either state or LATA specific percentages. PiuPercents 114 contains data for Direct Trunked Transport (DTT) and Entrance Facility (EF) PIU percentages. Methods allow the object to obtain and set these data variables.

Rate 116 variables are associated with CAP-based rates, LATA-based rates, and state-based rates. Methods provide for acquisition and assignment of the data. Special interstate and intrastate responsibilities apply. For each, resultant RateAmounts 118 are returned for a carrier rate structure to create the applied rate based on the appropriate equation. If no such rate key is found, a default is returned. A LATA specific rate is used if (1) LATA rates exist for the carrier; (2) the rate key exists within the LATA rate structure; and (3) the LATA portion of the rate key exists within the rate structure. If these three conditions are not met, a non-LATA specific process is used. Finally, Rate 116 may add new entries to the rate structure.

RateAmounts 118 relates to portions of the rate calculation. The object obtains and sets the instance variables. These include an application code which determines which equation to use in a rate calculation and fixed and variable portions of the calculations used for rates.

As illustrated in FIG. 11, CalculationSubApp 120 has two main subclasses, the abstract superclass DiscountCalculations 122 and the abstract superclass MonthlyRecurringCostCalculations 128 (abbreviated as MonthlyRecurringCostCalc in FIG. 11). It is the CalculationSubApp 120 that is the foundation for all cost calculations, and it is treated as a valid object with responsibilities.

DiscountCalculations 122 also has two subclasses, CircuitBasedDiscounting 124 and ContractBasedDiscounting 126. DiscountCalculations 122 basic functions are to initialize, return, or assign variables for the dictionary containing ratcheted items and store the information in that dictionary. The subclass CircuitBasedDiscounting 124 houses the calculation for circuit based ratcheting. The object returns a discount type descriptor and the value of the circuit's ratcheting. ContractBasedDiscounting 126 houses the calculation for contract based ratcheting. The object returns a discount type descriptor and the value of the contract's ratcheting.

MonthlyRecurringCostCalculations 128 has twelve subclasses. It is the top level of the monthly recurring facility cost hierarchy. It houses the instance for the particular calculation, interstate charge variable, and general utilities. The major methods include: "name" which returns the name for each calculation, "reset" which initializes interstate and intrastate charge variables for the calculation to nil, and "value" which returns the gross value of the calculation variables. These methods are either reimplemented or overridden by each of the major subclasses for their respective charge instance variables.

Other responsibilities include storing the values of a circuit calculation and an interstate calculation variable. The values may be returned as a response or set. Classes will be identified as included or not included in specific calculation elements such as a ratcheting calculation, special cost for net or gross calculation, a switched cost, a summary cost, or a CAP/AAV.

ChanTermRatchetingCalc 130 is the first of twelve MonthlyRecurringCostCalculations 128 subclasses. This class houses the special channel termination ratcheting processes in which calculations for DS3 circuits are impacted. The object indicates whether special or ratcheting calculations are to be incorporated and returns the value, if any, of channel termination ratcheting percentage information.

CustomerChanTermCalc 132 is a subclass of MonthlyRecurringCostCalculations 128 and an abstract superclass of DS0CustomerChanTermCalc 134 and DS1CustomerChanTermCalc 136. CustomerChanTermCalc 132 houses the customer channel termination processes. Only special access circuits are impacted by this calculation hierarchy which makes a determination of special cost considerations and channel termination rate elements. The Carrier class structure, illustrated in FIG. 10, is the primary collaborator. DS0CustomerChanTermCalc 134 and DS1CustomerChan-TermCalc 136 each calculate the value of their respective DS0 and DS1 circuits.

GrossMRCCalc 138 is the third subclass of MonthlyRecurringCostCalculations 128. It handles the gross summation process for facility charges, either special or switched. Circuit 50 is the primary collaborator. The circuit's calculations collection is examined and non-ratcheting components are added to the components of the gross MRC elements.

MileageChargeCalc 140 is another subclass of MonthlyRecurringCostCalculations 128. This class structure houses the mileage calculation process. The structure covers special and switched DS0s, special and switched DS1s, and special and switched DS3s. The value of the interstate mileage charge is derived and stored as a fixed and variable portion. Ratcheting, PIU, and special costs are factored into the calculation. Circuit-specific mileage rate elements are incorporated and a value for the mileage charge is returned.

Another MonthlyRecurringCostCalculations 128 subclass is the MuxCalc 142 class. MuxCalc 142 is an abstract superclass of DS1MuxCalc 144, DS3MuxCalc 146, LTR-MuxCalc 148 and SwitchedDS3SpecialMuxCalc 150. MuxCalc 142 contains the structures for mux calculation processes. The structure covers special and switched DS1s as well as special and switched DS3s. The calculation incorporates charges for additional muxes, indicates if special costs should be considered, and returns an interstate applied rate and circuit quantity.

The MuxCalc 142 subclasses return a value for the interstate applied rate given additional constraints. DS1MuxCalc 144 returns a value for the interstate mux charge given DS1 elements. DS3MuxCalc 146 returns a value for the circuit quantity used for additional mux processes associated with a DS3 and the interstate mux charge given the DS3 elements, adding charges for additional muxes, switched, and special costs when appropriate. LTR-MuxCalc 148 returns the value of a mux base charge. Both interstate and intrastate rates can be calculated incorporating PIU when applicable to an EF. The calculation may incorporate special or switched costs for a determination of DS1s, DS3s, or Local Transport Restructuring (LTR). SwitchedDS3SpecialMuxCalc 150 returns a special mux charge of a switched DS3, based on active special DS0s on a DS3.

MuxMileageRatchetingCalc 152 is a subclass of MonthlyRecurringCostCalculations 128 housing the special mux and mileage ratcheting process calculations. Only special DS3s are impacted. The interstate value of the mux/mileage ratcheting percentage is returned. Special and ratcheting costs are main considerations.

NetMRCCalc 154 is the seventh subclass of MonthlyRecurringCostCalculations 128. This class is responsible for the net summation process for the MRC facility charges, either special or switched, for which a value is returned. This class collaborates with a circuit's calculations collection. The basic equation is to sum the gross elements and multiply the result times the appropriate discount. The discount is obtained by subtracting the ratcheting values from a value of one.

The remaining MonthlyRecurringCostCalculations 128 subclasses are OffCalc 156, PopChanTermCalc 158, SwitchedRatchetingCalc 166, SystemAllocationCalc 168, and SystemAllocationRatcheting 170. Of the five, only PopChanTermCalc 158 has subclasses. PopChanTermCalc 158 is a superclass for DS3PopChanTermCalc 160, EntranceFacilityCalc 162, and SwitchedDS3SpecialPopChanTermCalc 164.

OffCalc 156 handles the optional features and functions (OFF) calculation process. Only special DS0s and DS1s are impacted.

PopChanTermCalc 158 houses the POP channel termination processes. The calculation considers three specific situations: special DS1s and DS3s with facility-based cost information, Switched DS1s and special DS3s with switched components, and switched DS3s with special components. It is impacted by CAP/AAV, special costs, and channel termination rate elements. An interstate charge value may be returned, taking into consideration interstate applied rate elements based on appropriate rate keys.

The DS3PopChanTermCalc 160 Subclass incorporates a charge for DS3 circuits into the calculation. CAP rates for a DS1 Channel termination or EF special or switched rates may be integrated into the calculation. EntranceFacilityCalc 162 returns a value of an EF charge for an LTR classified circuit after determining if a non-EF situation exists. Intrastate applied rates from the circuit's appropriate end-point carrier, PIU applicable to the EF, special, and switched costs are taken into account. SwitchedDS3SpecialPopChanTermCalc 164 returns a special mux value for a switched DS3 based on active special DS1s on the DS3.

SwitchedRatchetingCalc 166 is responsible for the switched DS3 ratcheting process. A credit is calculated towards the charges entered in facility-based systems for special DS0s on the DS3. Thus, a value is returned for the interstate charge calculation of switched ratcheting percentage based on the special DS0 count for a circuit.

SystemChargeAllocationCalc 168 handles the system charge allocation process for those DS3s which are on contracts. DS3s can be either switched or special. The calculated contract interstate value allocation amount is returned for the circuits on the same contract. The System-Contract class, illustrated in FIG. 9, is the primary collaborator.

SystemChargeAllocationRatchetingCalc 170 handles the system charge allocation ratcheting percent process for those DS3s that are on contracts. Only special DS3s are incorporated into the interstate value of the channel termination ratcheting percentage that is returned. The SystemContract class, illustrated in FIG. 9, is the primary collaborator.

II. UNIT COST MODEL DRIVER

The second portion of the system is the Unit Cost Model (UCM) Driver 40. It is unique in that processing occurs in a parameter driven batch mode, making minimal use of the GUI (Graphical User Interface) aspects of OO. It is UCM Driver 40 that ultimately controls interaction with the remote database, and it controls the start to finish costing process, including population and extraction of values.

Figure 12:
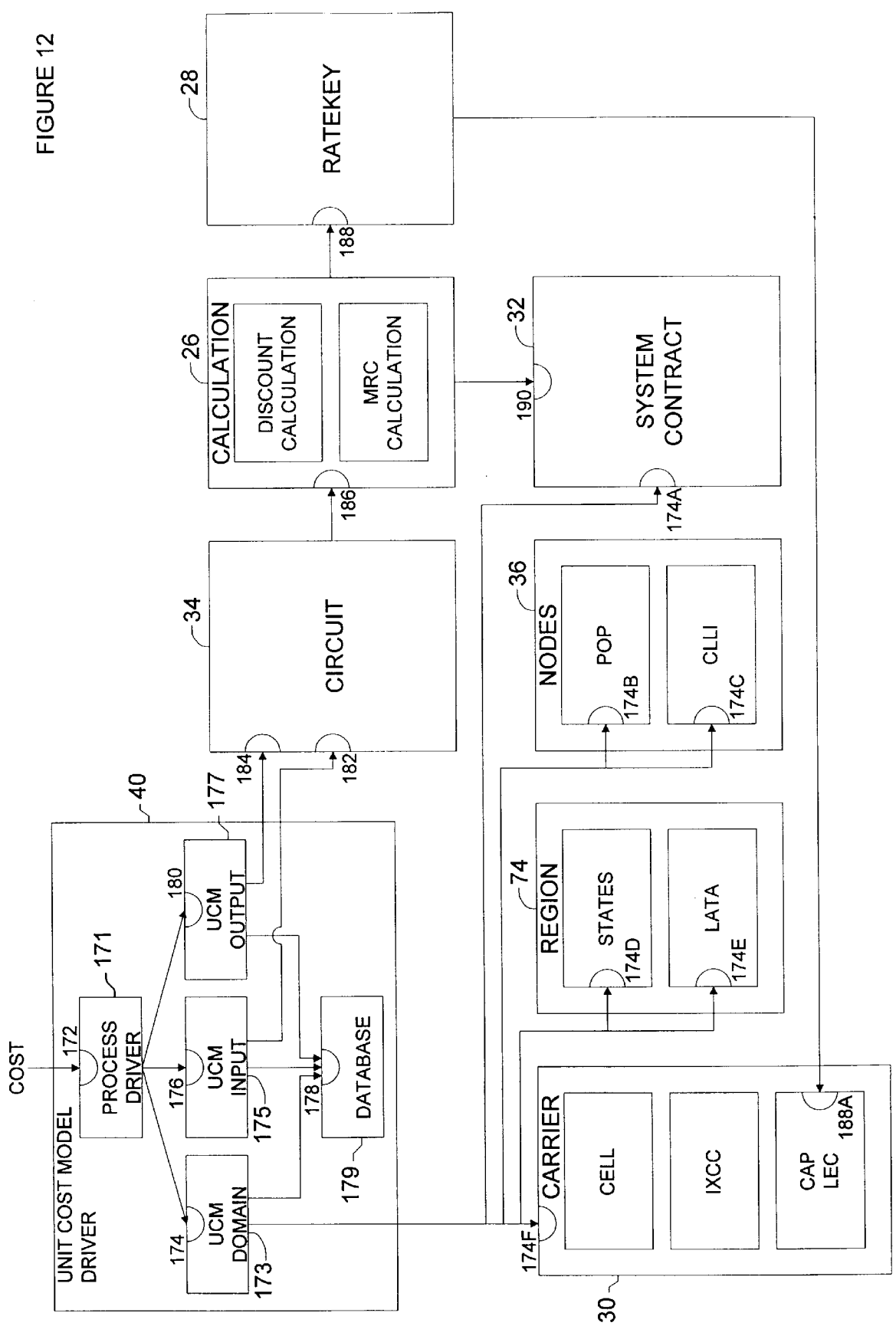
FIG. 12 illustrates an example of batch processing of Unit Cost Model objects.

With reference to FIGS. 3–12, it can be seen that interaction between the ProcessingDriver 171 and the Domain objects occurs through an intermediary. As shown in FIG. 12, UCM Driver 40 comprises the ProcessingDriver 171, the UnitCostModelDomain (UCMDomain) 173, the UnitCostModelInput (UCMInput) 175, and the UnitCostModelOutput (UCMOutput) 177. Database 179 may be depicted either as a part of UCM Driver 40 (as in FIG. 12) or as a separate entity.

Each of the components of UCM Driver 40 has different responsibilities. The UCMDomain 173 loads the Carrier 30, Region 74, Nodes 36, and SystemContract 32 objects with data from the database 179. UCMInput 175 loads circuit related information from database 179 and attaches the Calculations object 26. UCMOutput 177 applies the cost calculations to the circuits for each LATA, processes each POP, and updates database 179 with new information.

The collaborations between UCM Driver 40 and the Domain objects can accurately be described using a concept referring to the objects as clients and servers. Collaborations describe the responsibilities that are apportioned in the system of objects to accomplish the calculation of circuit costs. The objects that collaborate can be termed as clients and servers where the objects that provide services are servers, and the objects that use services are termed clients. In a pictorial having an object A, an object B, and an arrow drawn from A to B symbolizing a request, A represents the client, B represents the server, and the arrow represents the collaboration or interaction between the two objects.

FIG. 12 illustrates these concepts and demonstrates the interaction of the objects, a process which defines the responsibilities of the UCM Driver 40 and realizes the cost calculation. FIG. 12 resembles a flow of the processing with broad, general responsibilities of the classes. A message 172 is sent to UCM Driver 40 (from an application) requesting it to start the batch processing and perform cost calculations. The ProcessingDriver 171 begins the costing by requesting UCMDomain 173 to load relevant Domain objects. Note that ProcessingDriver 171 is the client in this situation and UCMDomain 173 is the server. The semicircle labeled 174 illustrates that a collaboration (request) was sent to UCMDomain 173. It does not represent a specific message, only that a request was made to that object. The UCMDomain 173 creates dictionaries, instantiates, and populates (from database 179) the SystemContract 32 (message 174A), Pop 86 (174B), Clli 84 (174C), States 78 (174D), Lata 76 (174E), and Carrier 30 (174F). Such a load would include populating the carriers PIU percentages for LEC carriers, adding the POPs to the appropriate LATAs, populating the carrier CAP rates, populating the rate structure of the carriers with the LEC rates, adding the CLLIs to the appropriate LATAs, and altering the jurisdiction of those CLLI objects whose carriers have opted for zone pricing. Population occurs after the data is loaded by UCMDomain 174 from database 179 (message 178).

ProcessingDriver 171 begins the circuit loading and costing process. It sends a message 180 to UCMOutput 177 to preprocess. UCMOutput 177 tags the circuits which are associated with relevant LATAs (message 184).

The ProcessingDriver 171 sends a request 176 to the UCMInput 175 to obtain the circuits for the selected LATAs. UCMInput 175 loads the circuit data from the database 179 to Circuit 34 (message 182). Thus, the Circuit is instantiated. ProcessingDriver 171 then sends a Cost and Update message 180 to UCMOutput 177. This causes UCMOutput 177 to relay the information to Circuit 34 (message 184).

Two activities occur. First, cost is assessed for the circuits for each LATA by determining what calculations have been attached to the circuit (message 186) and determining the costs associated with SystemContract 32 (message 190). For each calculation attached to the circuit (message 186), a RateKey (message 188) is formed, and the CAP/LEC Carrier (message 188A) is accessed for the applied rate to be used towards each calculation of the cost for the circuit (message 186). Finally, each POP is processed and the database 179 updated with the results (message 178).

Figure 13:
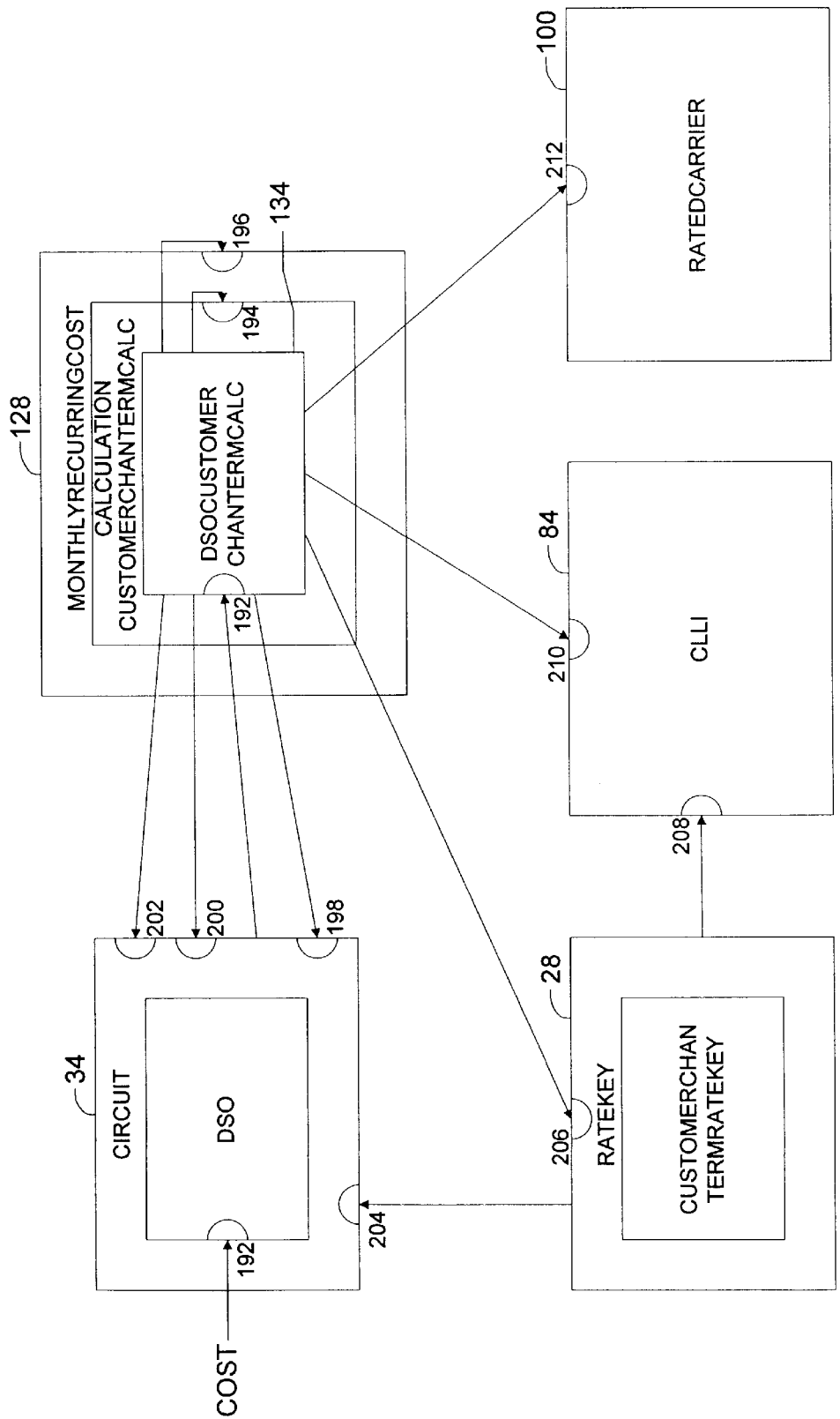
FIG. 13 is an example of collaboration required for a specific calculation involving a circuit.

The cost calculation message sent to the circuit may be more readily understood by an example expanding on the calculation. FIG. 13 illustrates the collaboration undertaken between the Domain objects for the calculation of a DS0 customer channel termination cost at the customer end. A message 192 is sent to Circuit 34 to perform a channel termination cost calculation at the customer end for a DS0 circuit, and it (message 192) is passed to the Calculations subclass DS0CustomerChanTermCalc 134. There is a determination of whether the circuit has a channel termination rate element (message 194) and whether the circuit carrier is a CAP (message 196). The Calculations object determines the customer end CLLI (message 198), the billable length (message 2OO), and circuit capacity (message 202). The circuit rating type is determined (message 204), and a rate key is built consisting of a cost center, LATA, rate elements, and an interstate key value (message 206). There is a determination of the state code and jurisdiction for the purpose of forming an interstate rate value (message 208) and the owning carrier for the circuit customer Clli 84 (message 210). Finally, the charge is calculated based on the rate key (message 212).

Those skilled in the art will appreciate variations in the above embodiments that will support the requirements of the invention. As such, the invention should not be restricted to the above embodiments. The invention should only be defined by the following claims.

Having thus described the invention, we claim:

1. An object oriented system for modeling a selected telecommunications circuit to determine access cost associated with the selected telecommunications circuit, the system comprising:

a plurality of telecommunications objects adapted to communicate with one another, to model the selected circuit, to generate a rate structure based upon the model of the selected circuit, and to use the rate structure for providing a cost for a carrier to access the selected circuit for a connection between a first selected premises and a second selected premises based upon circuit attribute date associated with the selected circuit; and a controller object adapted to obtain the circuit attribute data associated with the selected circuit and to provide the circuit attribute data to the plurality of telecommunications objects.

2. The system of claim 1, wherein the plurality of telecommunications objects comprises a calculations object for collecting cost information from the other telecommunications objects to compute the access cost for the selected circuit.

3. The system of claim 1, wherein the selected circuit comprises a local exchange carrier circuit.

4. The system of claim 3, wherein an end of the local exchange carrier circuit terminates at an interexchange carrier point of presence.

5. The system of claim 4, wherein another end of the local exchange carrier circuit terminates at a local exchange carrier end office.

6. The system of claim 1, wherein the access cost represents a unit cost for leasing the selected circuit.

7. The system of claim 1, wherein the rate structure includes means for evaluating a plurality of cost parameters, including cost variables and rate elements, to determine the access cost.

8. The system of claim 1, wherein the selected circuit comprises an alternative access vendor circuit.

9. An object oriented system for modeling a plurality of telecommunications circuits to determine access cost for a selected circuit, the system comprising:

a database for storing circuit attribute data associated the plurality of telecommunications circuits;

a processor adapted to obtain circuit attribute data associated with the selected circuit from the database; and a domain object processable by the processor and adapted to model the selected circuit, to use the circuit attribute data obtained from the database to generate a rate structure based upon the model of the selected circuit, and to use the rate structure to determine a cost for a carrier to access the selected circuit for a connection between a first selected premises and a second selected premises.

10. The system of claim 9, wherein the processor comprises is a personal computer.

11. The system of claim 9, wherein the database resides on a mainframe computer.

12. The system of claim 9, wherein the domain object comprises a plurality of telecommunications objects adapted to communicate cost information with one another, and to cooperate with one another to collectively output the access cost for each selected circuit based upon predefined cost parameters.

13. The system of claim 9, further comprising a unit cost model driver object processable by the processor and adapted to provide the domain object with circuit attribute data from the database.

14. A method for modeling one or more telecommunications circuits to estimate access cost for a selected one of the one or more telecommunications circuits, the method comprising:

storing circuit attribute data associated with the one or more telecommunications circuits in a database;

selecting a circuit from the one or more telecommunications circuits for access cost analysis;

providing an object oriented system comprising a domain object adapted to model the selected circuit and to generate a rate structure based upon the model of the selected circuit;

retrieving circuit attribute data associated with the selected circuit from the database and providing the circuit attribute data to the domain object; and processing the circuit attribute data with the rate structure to determine a cost for a carrier to access the selected circuit for a connection between a first selected premises and a second selected premises.

15. The method of claim 14, wherein the processing step is performed in a batch processing mode.

16. The method of claim 14, wherein the domain object resides on a personal computer.

17. The method of claim 16, wherein the domain object comprises a plurality of telecommunications objects which provide cost parameter information for the processing step.

18. The method of claim 14, wherein the selected telecommunications circuit comprises a local exchange carrier circuit.

19. The method of claim 18, wherein the local exchange carrier circuit extends from an end office to a point of presence.

20. The method of claim 14, wherein the selecting step further comprises selecting a plurality of telecommunications circuits from a local access and transport area.

21. An object oriented apparatus processable on a processor comprising:

circuit loading means for receiving input signals representative of circuit data associated with an access cost of a selected telecommunications circuit;

object oriented circuit modeling means, coupled with the circuit loading means, for generating a computer model of the selected circuit and a rate structure based upon the computer model in accordance with the signals received by the circuit loading means; and output means, coupled with the circuit modeling means, for using the rate structure to generate an output signal representative of a cost for a carrier to access the selected circuit for a connection between a first selected premises and a second selected premises.

22. The apparatus of claim 21, further comprising means for selecting the telecommunications circuits from a plurality of telecommunications circuits.

23. The apparatus of claim 22, wherein a plurality of circuits are selected by identifying a particular local access and transport area.

24. The apparatus of claim 21, wherein the circuit loading means retrieves circuit data associated with the access cost of the selected circuit from a database containing circuit data associated with the access cost of a plurality of telecommunications circuits.

25. The apparatus of claim 24, wherein the circuit modeling means resides on a personal computer.

26. The apparatus of claim 25, wherein the circuit loading means transmits the retrieved circuit data to the personal computer.

27. The apparatus of claim 26, wherein the output means transmits the output signal to the database.

28. The apparatus of claim 27, wherein the access cost represented by the output signal is stored in the database.

29. The apparatus of claim 21, wherein the output signal represents a unit cost for accessing the selected telecommunications circuit.

30. The apparatus of claim 21, wherein the circuit modeling means comprises a plurality of telecommunications objects representing specific cost parameters for leasing the selected telecommunications circuit.

31. A telecommunications object in an object oriented system adapted to model telecommunications circuits and estimate an access cost for a selected telecommunications circuit, said telecommunications object comprising:

means for retrieving circuit attribute data associated with the selected telecommunications circuit;

means for generating an output representing an applied cost of access based on cost variables and rate elements associated with the circuit attribute data; and means for controlling the generating means and the retrieving means in a batch processing mode.

32. The object of claim 31, wherein the object comprises a calculations object comprising object methods and variables for establishing discount cost calculations for the selected circuit.

33. The object of claim 32, further comprising object methods and variables for establishing a dictionary for discounted items.

34. The object of claim 32, further comprising object methods and variables for returning a value for circuit based ratcheting.

35. The object of claim 32, further comprising object methods and variables for returning a value for contract based ratcheting.

36. The object of claim 31, wherein the object comprises a calculations object comprising object methods and variables for determining monthly recurring cost calculations for the selected circuit.

37. The object of claim 36, further comprising object methods and variables for creating an instance of a monthly recurring cost calculation.

38. The object of claim 36, further comprising object methods and variables for returning a value based on switched and special charges, interstate and intrastate charges, entrance facility rates, and channel termination rates.

* * * * *